United States Patent [19]

Goodzeit et al.

[11] Patent Number: 5,201,833
[45] Date of Patent: Apr. 13, 1993

[54] ATTITUDE CONTROL SYSTEM WITH REACTION WHEEL FRICTION COMPENSATION

[75] Inventors: Neil E. Goodzeit, East Windsor; Michael A. Paluszek, Lawrenceville; Walter J. Cohen, Hightstown, all of N.J.

[73] Assignee: General Electric Company, East Windsor, N.J.

[21] Appl. No.: 732,963

[22] Filed: Jul. 19, 1991

[51] Int. Cl.5 .............................................. B64G 1/28
[52] U.S. Cl. .................................. 244/165; 364/434; 364/459; 244/170
[58] Field of Search ...................... 244/164, 165, 3.21, 244/3.22, 3.20, 170, 171; 364/434, 148, 459; 318/564, 565, 648, 649

[56] References Cited

U.S. PATENT DOCUMENTS 3,998,409 12/1976 Pistiner ................................ 244/165
4,260,942 4/1981 Fleming .
5,020,745 6/1991 Stetson, Jr. .......................... 244/165
5,058,835 10/1991 Goodzeit et al. .................... 244/165

Primary Examiner—Galen Barefoot
Attorney, Agent, or Firm—William H. Meise; Stephen A. Young; Clement A. Berard

[57] ABSTRACT

A spacecraft attitude control system uses one or more momentum or reaction wheels. Wheel bearing viscous (velocity-dependent) friction reduces the actual torque imparted to the spacecraft in response to a torque command signal. Friction compensation is provided by applying the torque command signal to a model of an ideal, friction-free wheel, and calculating the speed which the ideal wheel achieves in response to the torque command. An error signal is generated from the difference between the ideal wheel speed and the actual wheel speed. The error signal is summed with the torque command signal to produce the wheel drive signal. This results in a closed-loop feedback system in which the actual wheel speed tends toward the ideal wheel speed, thereby causing a torque on the spacecraft which is substantially equal to that commanded.

5 Claims, 4 Drawing Sheets

ATTITUDE CONTROL SYSTEM WITH REACTION WHEEL FRICTION COMPENSATION

The Government has rights in this invention pursuant to Contract F04701-89-C-0073 with the Department of the Air Force.

BACKGROUND OF THE INVENTION

This invention relates to spacecraft using reaction wheel or momentum wheel torquing systems for attitude control, and particularly to those in which the effects of wheel friction are compensated.

It is well known that spacecraft must be controlled and directed in order to achieve their intended results. Control may be achieved by chemical thrusters, but such thrusters consume fuel, and tend to reduce the useful life of the spacecraft. Wherever possible, spacecraft ordinarily use magnetic torquers, reaction wheels or momentum wheels (termed reaction wheels herein), or a combination of magnetic torquers and reaction wheels. A spacecraft may use only one reaction wheel, or it may use a plurality of reaction wheels. U.S. Pat. No. 5,020,744, issued Jun. 4, 1991 in the name of Schwarzchild, describes a spacecraft with a single reaction wheel. In principle, three mutually orthogonal reaction wheels can provide complete 3-axis control. For purposes of reliability, four or more reaction wheels may be advantageous as described in allowed U.S. patent application Ser. No. 07/535,675, filed Jun. 11, 1990 in the name of Goodzeit et al., now U.S. Pat. No. 5,058,835, and in U.S. Pat. No. 3,999,729, issued Dec. 28, 1976 in the name of Muhlfelder et al.

Attitude control is generally achieved by comparing the desired attitude of the spacecraft with the actual orientation, however measured, and by generating torque command signals representing the desired torque which is to be applied to the spacecraft body to slew the actual attitude toward the desired attitude. When magnetic torquers are used, various compensations must be made to take into account the magnetic environment, as described in allowed patent application Ser. No. 07/564,994, filed Aug. 8, 1990 in the name of Paluszek, now U.S. Pat. No. 5,047,945.

In reaction wheel control systems in which the wheel speed passes through zero, the effects of wheel bearing friction perturb the attitude, as described in U.S. Pat. No. 5,020,745, issued Jun. 4, 1991 in the name of Stetson, Jr. As described therein, a dither signal is applied when the wheel is at a low speed to provide sufficient energy to the wheel to free it from the "sticktion" component of friction.

An attitude control system with improved friction compensation is desired.

SUMMARY OF THE INVENTION

A spacecraft attitude control system includes a source of torque command signal. The torque command signal is applied to a model of an ideal wheel, and the speed of the ideal wheel in response to the torque command signal is computed. The difference between the computed speed of the ideal wheel and the actual speed of the reaction wheel is used to generate an error signal. The error signal is summed with the torque command signal to drive the reaction wheel.

DESCRIPTION OF THE INVENTION

Figure 1:
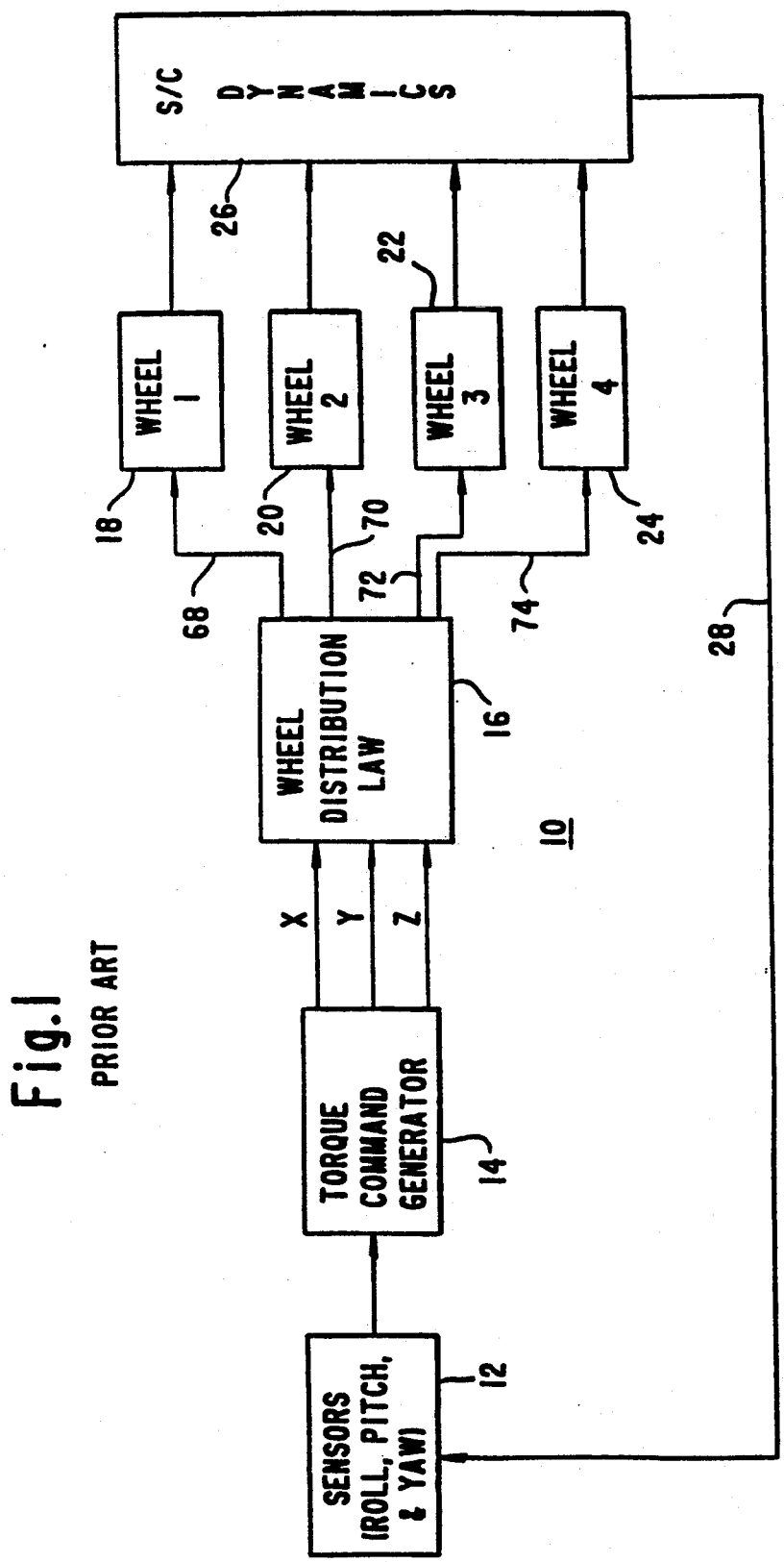
FIG. 1 is a simplified block diagram of the attitude control system of a prior art 3-axis stabilized spacecraft including four mutually skewed reaction wheels.

In FIG. 1, a spacecraft designated generally as 10 includes attitude sensors, illustrated together as a block 12. Those sensors are of well-known types adapted to the particular use, and may include gyroscopes, Earth horizon sensors and/or star sensors for generating signals representative of the attitude of the spacecraft. Block 12 may also include such estimators as may be required for estimating the magnitude of a component of attitude which is not directly sensed. The attitude-representative signals are applied from block 12 to a block 14, which represents a torque command generator. Such a generator is loaded with knowledge about the desired attitude and the physical properties of the spacecraft such as the inertia about the various axes, designated x, y and z. Block 14 processes the attitude information together with other information, such as reaction wheel speed, to determine if magnetic torquers or chemical thrusters (not illustrated) must be used. If reaction wheels must be used, block 14 generates torque command signals on x, y and z data paths to indicate the torques which are required about those axes to cause the spacecraft to assume the desired attitude. The torque command signals are applied to a wheel distribution law illustrated as a block 16 for converting the desired torque command signals into wheel drive signals, in which the various mutually skewed wheels are driven so that the net torque applied to the spacecraft equals the commanded torque. The wheel drive signals are applied over paths 68, 70, 72 and 74 to reaction wheels illustrated as blocks 18, 20, 22 and 24. Wheels 18–24 (where the hyphen represents the word "through") are mutually skewed in a manner such that failure of any one wheel leaves operating wheels having significant control over all three orthogonal axes. Wheels 18–24 torque the spacecraft, and change its attitude. The spacecraft dynamics are illustrated as a block 26. The effect of the dynamics and the attitude change in turn affect the sensors of block 12, as represented by feedback path 28. Those skilled in the art recognize that distribution law 16 may be combined with torque command generator 14.

In operation of the system of FIG. 1, the various reaction wheels may operate at different angular velocities. As a result, the magnitudes of the viscous (speed-dependent) friction component of the bearing friction will vary from one wheel to the next, even if the Coulomb (running) components of the bearing friction are equal. However, even the Coulomb friction components may differ. Bearing friction opposes acceleration of a wheel in response to an applied wheel drive signal. Consequently, a portion of the wheel drive signal goes to accelerate the wheel and thereby produces an equal and opposite acceleration or torque on the spacecraft, and another portion of the drive signal is expended in overcoming the friction, which does not result in useful torque. Thus, the torque command signal, as distributed and applied to the wheels, will result in a different torque applied to spacecraft body than that which was commanded. This torque error can produce large attitude errors when a wheel passes through zero speed because its coulomb friction torque changes sign. In addition, when a wheel sticks at zero speed it applies no torque at all to the spacecraft, even though a torque may be commanded. Also, differences among the wheel frictions can cause large attitude errors during spacecraft reorientation or slew maneuvers. Because of friction mismatches within skewed wheel configurations, torquing on one spacecraft axis will result in torques and attitude errors on the other two axes.

Figure 2:
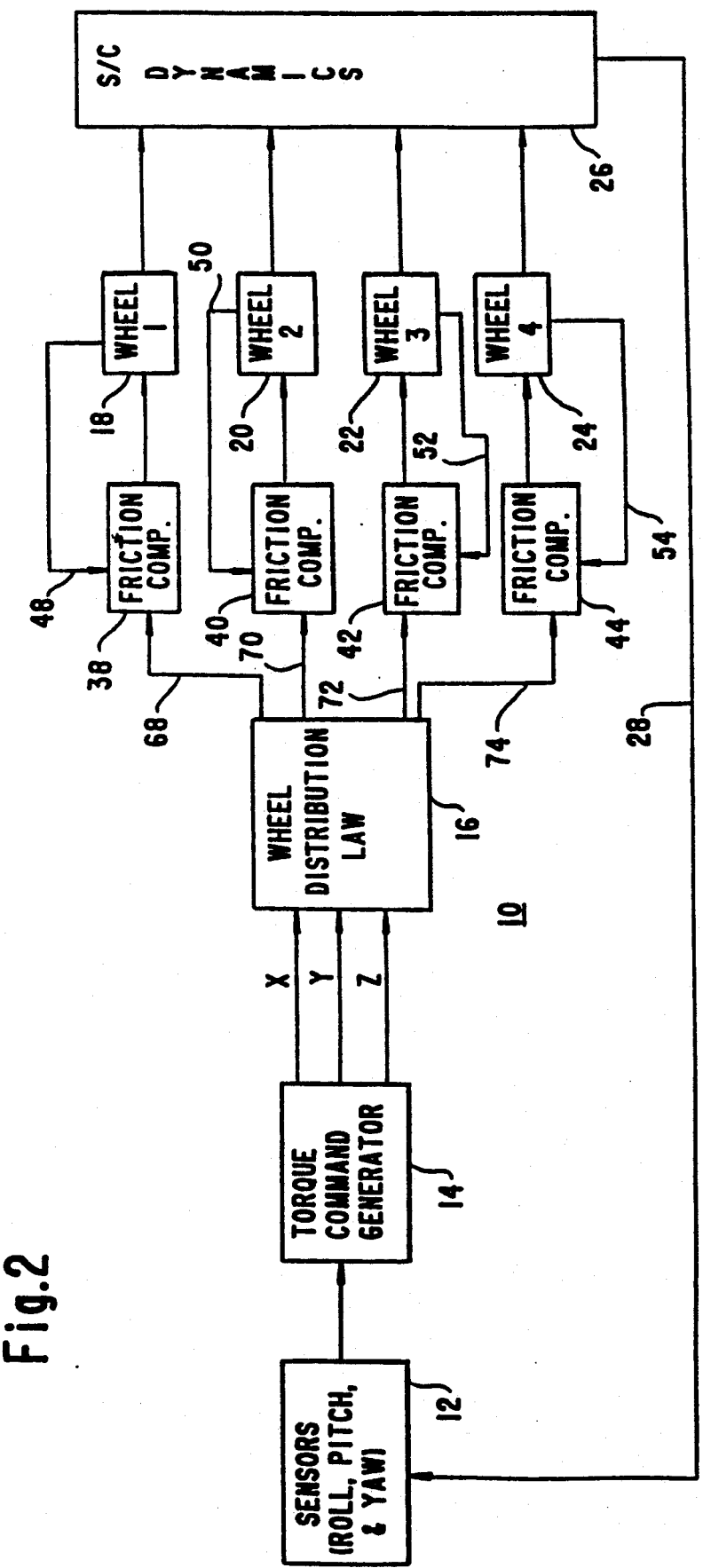
FIG. 2 is a simplified block diagram of the attitude control system of a 3-axis stabilized spacecraft according to the invention, illustrating the distribution of the torque command signals, and the closed feedback loop which controls wheel speed in a degenerative manner.

FIG. 2 is a simplified block diagram of a spacecraft with an attitude control system according to the invention. In FIG. 2, elements corresponding to those of FIG. 1 are designated by like reference numerals. FIG. 2 differs from FIG. 1 in that it includes further friction compensator blocks 38, 40, 42 and 44 associated with wheels 18, 20, 22 and 24, respectively, for accepting the torque command signal from distribution block 16, and for modeling an ideal frictionless wheel having the same inertial characteristics as the wheel with which it is associated. For example, friction compensator block 40 includes information for modeling an ideal, frictionless wheel having the same characteristics as wheel 20. As described below, each friction compensator receives the torque command signal which is distributed thereto, and "applies" it to the model to calculate the speed which the wheel would ideally achieve in response to that torque command signal, and produces a wheel drive signal which drives the wheel toward the ideal speed. As an aid in achieving this end, each friction compensator 38-44 receives from its associated wheel 18-24 respectively, wheel speed representative signals over data paths 48-54, respectively.

Figure 3:
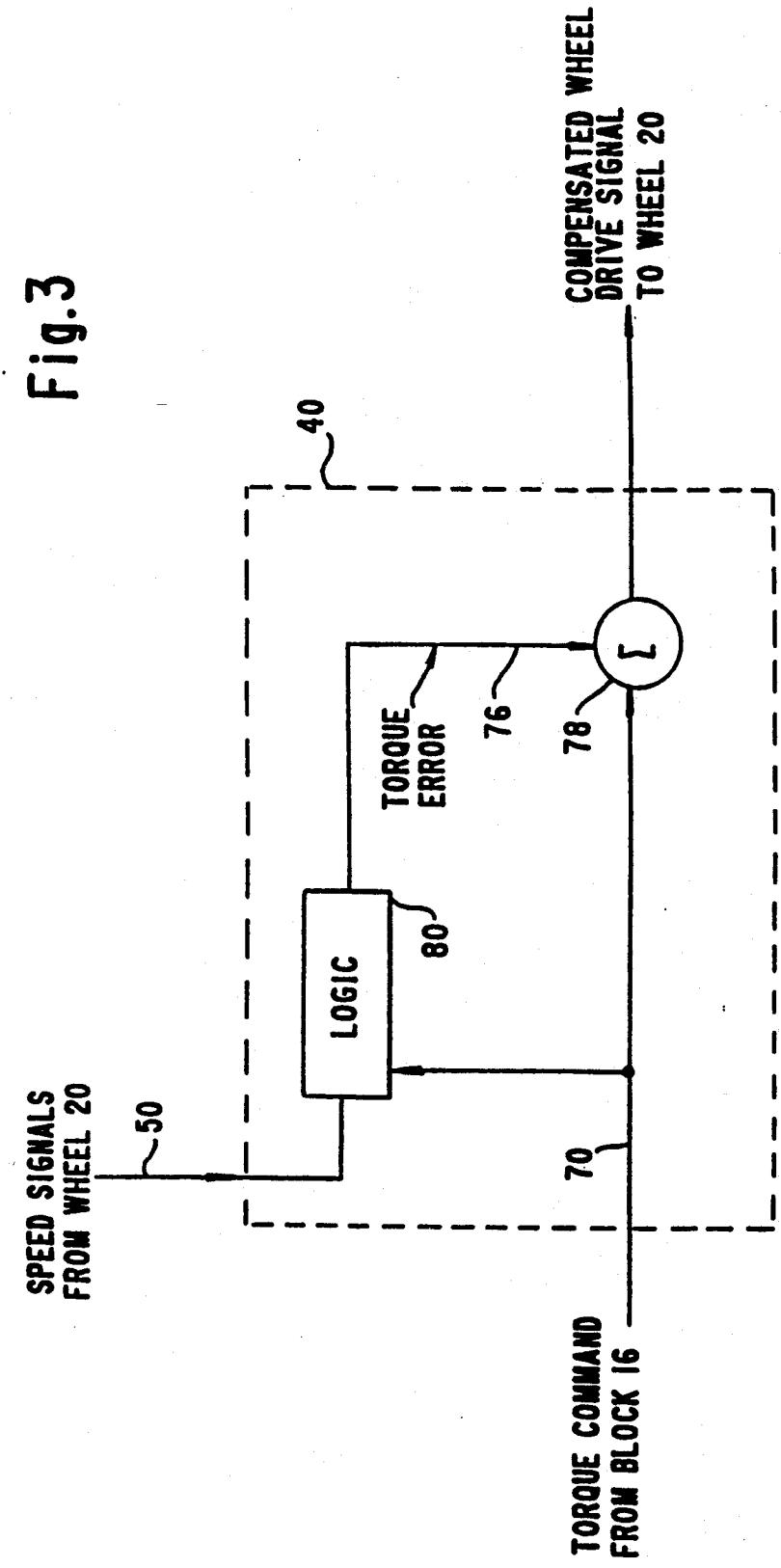
FIG. 3 is a simplified block diagram of a portion of the arrangement of FIG. 2.

FIG. 3 is a simplified block diagram of representative friction compensator 40 of FIG. 2. Friction compensators 38, 42 and 44 are similar. In FIG. 3, elements corresponding to those of FIG. 2 are designated by like reference numerals. In FIG. 3, the torque command signal distributed to friction compensator 40 from distribution block 16 is applied over path 70 to a summing circuit 78 and to a logic block 80. Block 80 also receives speed information from wheel 20 over path 50. As described below, logic block 80 processes the information to generate a torque error signal representing the difference between the actual wheel speed and the speed which an ideal, friction free wheel would have, and applies this error signal over a path 76 to a second input of summing circuit 78. Summing circuit 78 adds the torque command signal with the error signal to produce a wheel drive signal which is applied to drive wheel 20. Friction compensator 40 and its connections to wheel 20 form a feedback system which drives the wheels toward the ideal speed corresponding to the input torque command signal, to within loop gain constraints.

Figure 4:
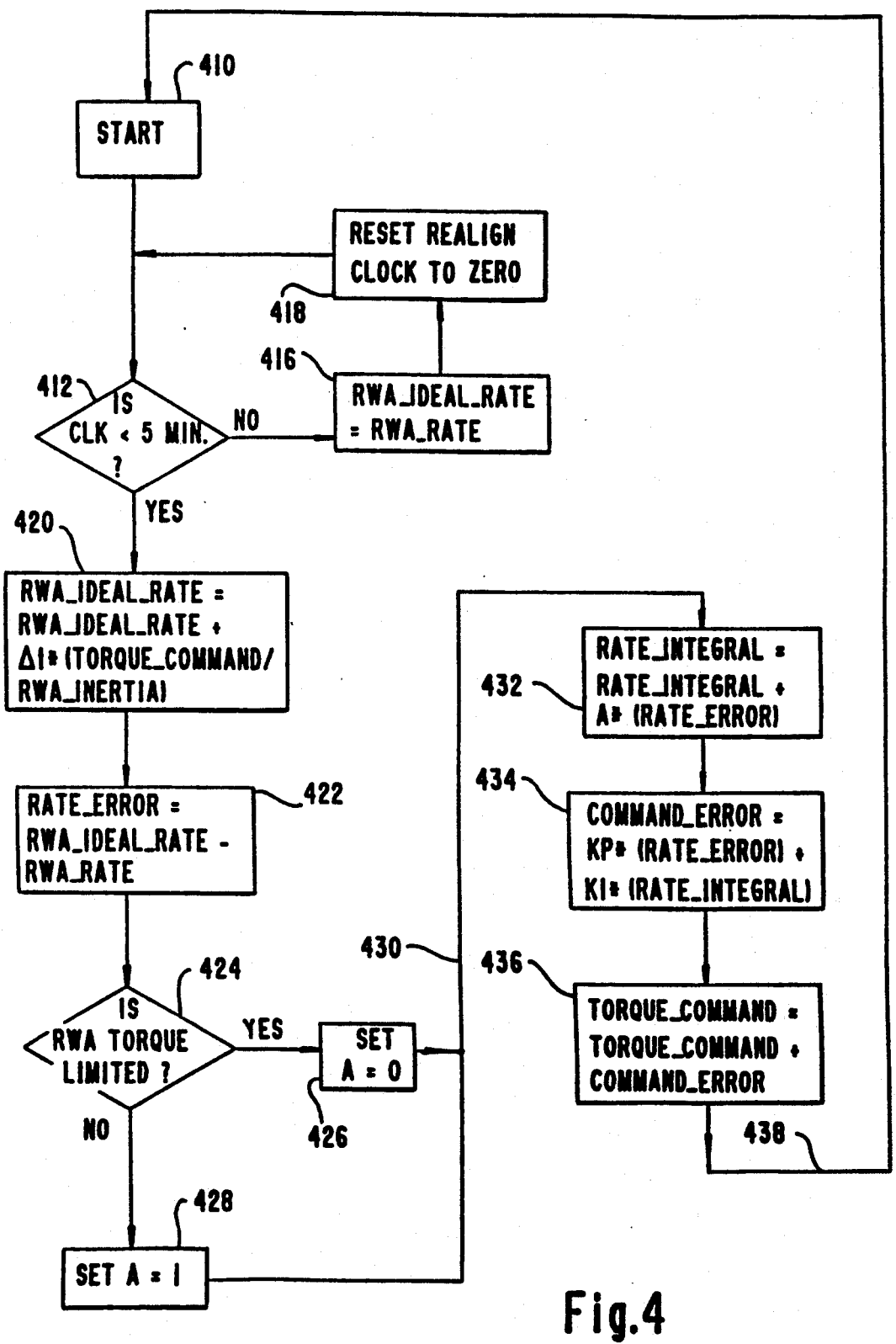
FIG. 4 is a simplified logic flow chart illustrating processing of signals in accordance with the invention.

FIG. 4 is a logic flow chart illustrating the recurrent processing which occurs in block 40 of FIG. 3. Corresponding calculations occur for the other wheels of the spacecraft. In general, a complete excursion through the logic of FIG. 4 is completed every time increment $\Delta t$ where $\Delta t$ may be, for example, 0.5 seconds. The time increment may equal the cycle rate of the spacecraft attitude control system, or it may be independently established.

The logic of FIG. 4 begins at a START block 410, and proceeds to a decision block 412, which represents a comparison of the count of the REALIGN clock with a threshold, which may be, for example, a period of 5 minutes. The ideal wheel is periodically reset to the actual RWA wheel speed to prevent the calculated speed from deviating too far from reality. If the clock time exceeds 5 minutes, the logic leaves decision block 412 by the NO output and arrives at a block 416. Block 416 represents the setting of the output (RWA_IDEAL_RATE) of the integrator representing the ideal speed of the reaction wheel assembly (RW) to a value (RWA_rate) representing the currently measured speed or rate of the physical reaction wheel, $$RWA\_IDEAL\_RATE = RWA\ Rate \quad (1)$$

From block 416, the logic flows to a block 418, which represents resetting of the REALIGN timing clock to a zero value. From block 418, the logic returns to decision block 412. When the REALIGN clock count is less than 5 minutes, the logic leaves decision block 412 by the YES output, and arrives at a block 420.

Block 420 integrates the angular velocity of the ideal wheel over the period of the REALIGN timer. It calculates the ideal wheel acceleration over the time interval ($\Delta t$) required for one traversal of the logic through the logic path represented by FIG. 4, and at each traversal of the logic adds to the calculated speed of the ideal wheel. More particularly, the angular acceleration is calculated as the quotient of the torque command divided by the RWA inertia.

The quotient is multiplied by incremental time $\Delta t$, which as mentioned equals the time interval between calculation, for example 0.5 seconds, and the result is added to the ideal RWA rate.

$$RWA\_IDEAL\_RATE = RWA\_IDEAL\_RATE + 0.5 * (TORQUE\_COMMAND/RWA\_INERTIA) \quad (2)$$

where the asterisk represents multiplication, and $\Delta t$ is set to 0.5 seconds.

From block 420, the logic proceeds to a block 412, which represents calculation of the difference or error between the ideal RWA rate and the measured RWA rate, $$RATE\_ERROR = RWA\_IDEAL_{13} RATE-RWA\_RATE \quad (3)$$

From block 422, the logic flows to a decision block 424. Block 424 sets a gain A to either zero or one, depending upon the physical RWA drive condition. If the drive to the physical RWA is limited because its torquing motor has reached it torque limit, the TORQUE COMMAND signal does not correctly represent the applied torque, and the logic leaves decision block 424 by the YES path and arrives at a block 426, in which gain A is set to zero for purposes described below. If the RWA torque has not saturated, the logic leaves decision block 424 by the NO path, and arrives at a block 428, which represents the setting of gain A to unity. Whether by way of block 426 or 428, the logic flows by a path 430 to a block 432.

Block 432 represents the calculation of the integral of the error $$RATE\_INTEGRAL = RATE\_INTEGRAL + A*(-RATE\_ERROR) \quad (4)$$

The factor A, when equal to unity, allows integration to take place during successive passes through the logic of FIG. 4, and prevents integration when A=0. This prevents a compounding of an erroneous acceleration in calculating the ideal RWA speed.

In block 432, the command error or torque error required for overcoming the friction of the associated physical reaction wheel is calculated.

$$COMMAND\_ERROR = (KP*RATE\_ERROR) + (KI*RATE\_INTEGRAL) \quad (5)$$

where KP and KI are the function compensation proportional and integral gains, respectively. The integral component of rate is added to the proportional component to provide stable response in the feedback loop.

Finally, the corrected torque command is calculated as the sum of the actual torque command plus the torque error $$TORQUE\_COMMAND = TORQUE\_COMMAND + COMMAND\_ERROR \quad (6)$$

following which the corrected torque command is applied to the physical wheel to cause its speed to approach that of the ideal wheel, and the logic returns by a path 438 to start block 410.

In operation, the calculations represented by FIG. 4 are performed at increments of $\Delta t$ which may be every 0.5 seconds, and the corrected torque command so calculated is applied to the physical wheel. The corrected torque command continues to be applied to the wheel until the next updated value is available. The ideal RWA is reset to the actual wheel speed at greater intervals, as for example 5 minutes.

Other embodiments of the invention will be apparent to those skilled in the art. Magnetic or other torquers may be used in conjunction with reaction wheels controlled according to the invention. While systems using four reaction wheels have been described, the number of wheels is not relevant to the invention, and any number of wheels may be used.

What is claimed is:

1. A spacecraft attitude control system comprising:
   generating means for generating a torque control signal;
   reaction wheel means adapted for responding to a torque drive signal for torquing said spacecraft;
   reaction wheel speed monitoring means coupled to said reaction wheel means for generating speed signals representative of the speed of said reaction wheel means; and
   coupling means coupled to said generating means, to said speed monitoring means and to said reaction wheel means, for modeling the response of an ideal reaction wheel in response to said torque control signal, and for taking the difference between the calculated speed of said ideal reaction wheel under the influence of said torque control signal and the actual speed of said reaction wheel means as represented by said speed signals, to produce a speed error signal, and for summing said speed error signal with said torque control signal to produce said torque drive signal for driving said reaction wheel means.

2. A method for torquing a spacecraft, comprising the steps of:
   generating torque command signals representing the desired torque to be imparted to said spacecraft;
   calculating the speed which an ideal, friction-free reaction wheel would attain in response to said torque command signal;
   spinning a reaction wheel assembly;
   measuring the speed of said reaction wheel assembly;
   generating error signals responsive to the difference between said speed of said reaction wheel assembly and said speed of said ideal reaction wheel; and
   controlling said reaction wheel assembly in response to a combination of said torque command signals and said error signals.

3. A method according to claim 2 wherein said controlling step comprises the step of summing together said torque command signal and said error signal.

4. A method according to claim 2, wherein said step of generating error signals comprises the steps of:
   generating rate signals representative of the difference between said speed of said reaction wheel assembly and said speed of said ideal reaction wheel;
   integrating said rate signals to form rate integral signals; and
   summing together signals proportional to said rate signals and said rate integral signals to form said error signals.

5. A spacecraft attitude control system, comprising:
   a torque control signal generator;
   a reaction wheel adapted for responding to a torque drive signal for torquing said spacecraft;
   a reaction wheel speed monitor coupled to said reaction wheel for generating speed signals representative of the speed of said reaction wheel;
   a logic system coupled to said generator and said monitor, for modeling the response of an ideal reaction wheel in response to said torque control signal, and for taking the difference between the response of said ideal reaction wheel to said torque control signal and the actual speed of said reaction wheel as represented by said speed signals, to produce an error signal; and
   an adder coupled to said generator, said logic system and said reaction wheel for summing said error signal with said torque control signal to form said torque drive signal for driving said reaction wheel.

* * * * *